US008948510B2

(12) United States Patent
Lee et al.

(10) Patent No.: US 8,948,510 B2
(45) Date of Patent: *Feb. 3, 2015

(54) METHOD FOR MERGING THE REGIONS IN THE IMAGE/VIDEO

(75) Inventors: Gwo Giun (Chris) Lee, Tainan (TW); He-Yuan Lin, Tainan (TW); Chun-Fu Chen, Tainan (TW); Ping-Keng Jao, Tainan (TW)

(73) Assignee: National Cheng Kung University, Tainan (TW)

( * ) Notice: Subject to any disclaimer, the term of this patent is extended or adjusted under 35 U.S.C. 154(b) by 444 days.

This patent is subject to a terminal disclaimer.

(21) Appl. No.: 13/456,286

(22) Filed: Apr. 26, 2012

(65) Prior Publication Data

US 2012/0294516 A1    Nov. 22, 2012

Related U.S. Application Data

(60) Provisional application No. 61/478,965, filed on Apr. 26, 2011.

(51) Int. Cl.
| | | |
|---|---|---|
| G06K 9/34 | (2006.01) | |
| G06K 9/00 | (2006.01) | |
| G06K 9/42 | (2006.01) | |
| G06K 9/44 | (2006.01) | |
| G06T 7/00 | (2006.01) | |

(52) U.S. Cl.
CPC ..... *G06T 7/0071* (2013.01); *G06T 2207/10016* (2013.01); *G06T 2207/10024* (2013.01)
USPC ............................ 382/173; 382/164; 382/257

(58) Field of Classification Search
None
See application file for complete search history.

(56) References Cited

U.S. PATENT DOCUMENTS

| | | | | |
|---|---|---|---|---|
| 6,169,817 | B1 * | 1/2001 | Parker et al. ................... | 382/131 |
| 8,761,501 | B2 * | 6/2014 | Lee et al. ....................... | 382/164 |
| 8,774,502 | B2 * | 7/2014 | Lee et al. ....................... | 382/164 |
| 2002/0181778 | A1 * | 12/2002 | Porikli ........................... | 382/204 |
| 2004/0259144 | A1 | 12/2004 | Prabhu | |
| 2005/0025357 | A1 | 2/2005 | Landwehr et al. | |
| 2006/0127881 | A1 * | 6/2006 | Wong et al. ....................... | 435/4 |
| 2010/0272357 | A1 * | 10/2010 | Maxwell et al. ............... | 382/173 |
| 2012/0293499 | A1 * | 11/2012 | Lee et al. ....................... | 345/419 |

OTHER PUBLICATIONS

Montero, R.—"State of the Art of Compactness and Circularity Measures"—International Mathematical Forum, 4, 2009, No. 27, pp. 1305-1335.*

* cited by examiner

*Primary Examiner* — Bernard Krasnic
(74) *Attorney, Agent, or Firm* — Bacon & Thomas, PLLC

(57) ABSTRACT

The present invention relates to a method for merging regions in the image/video, capable of merging plural of image regions into an image merging region. In the disclosed method, these image regions are first sequenced basing on their compactness value. Then, one of these image regions is designated as a reference image region, and a merging test process is executed by merging the reference image region with one of the nearby image regions thereof in sequence, for forming a temporal image merging region. Later, the compactness value of the temporal image merging region is compared with the compactness value of the two consisting image regions thereof, respectively. When the compactness value of the temporal image merging region is larger than either one of the compactness value of the two consisting image regions thereof, the temporal image merging region is designated as an image merging region.

9 Claims, 4 Drawing Sheets

| comparing each area value of the image feature region with a re-segmentation threshold value |

| re-segmenting the texture color feature region according to the distribution of the image signal in the texture feature region, when an area value of the color feature region is higher than the re-segmentation threshold value |

METHOD FOR MERGING THE REGIONS IN THE IMAGE/VIDEO

CROSS REFERENCE TO RELATED APPLICATION

This application claims the benefit of filing date of U.S. Provisional Application Ser. No. 61/478,965, entitled "Method for Converting from a 2-Dimensional Video to a 3-Dimensional Video" filed Apr. 26, 2011 under 35 USC §119(e)(1).

BACKGROUND OF THE INVENTION

1. Field of the Invention

The present invention relates to a method for merging the regions in the image/video, more particularly, to a method which can merge two or more than two image regions into a merged large-area image region according to a compactness value of each image region contained by an image signal, so as to enhance the efficiency of high image identification for an image region merging method.

2. Description of Related Art

Image region merging has been recognized as a sensitive issue in the image processing field. Firstly, in terms of computer language, an image region in an image signal sets out to merely represent a group of pixels having similar parameter values, such as those pixels of texture feature vectors belonging to an identical group or those pixels of texture feature vectors belonging to another identical group. Therefore, the computer itself cannot manage to merge the image pixels according to the underlying principle behind these image regions. An illustrating example would involve a merging operation between an image region representing a human body part and an image region representing a human head.

In the present state of technology of image region merging method, image pixel is commonly treated as a calculation unit, being equivalent to a so-called pixel-based algorithm, and these algorithms must work out to determine whether each image pixel merges with a neighboring image pixel. As such, in line with the traditional image region merging method, a lengthy period of time is required for the calculation of the aforementioned calculation unit. Moreover, another disadvantage of the traditional image signal resolution is that it turns to be extremely high (ex. Full HD), it will usually take several hours dedicated to processing an image signal's high resolution picture, such disadvantage invariably prevents the known image region merging method from becoming practical.

In addition, because the parameters for use by known image region merging method in determining merging requirement are identical to the parameters for use in categorizing each image pixel of an image signal into a plurality of groups, such as the parameters for use in determining color feature vector in two processes (merging process and categorizing process), it is common to see a situation where some image pixels that were originally categorized into different groups turn out to be merged into the same group after the following image region merging method, and leading to serious waste of calculation information, such as processing time of CPU.

Therefore, there is a need in the industry for a method which can merge two or more than two image regions into a merged large-area image region according to a compactness value of each image region contained by an image signal, so as to enhance the efficiency of high image identification for an image region merging method.

SUMMARY OF THE INVENTION

The present invention relates to a method for merging the regions in the image/video, whereby two or more than two image regions can be merged into a merged large-area image region according to a compactness value of each image region contained by an image signal, so as to enhance the efficiency of high image identification for an image region merging method.

To achieve the object of the present invention, the image region merging method of the present invention is provided for merging a plurality of image regions contained in an image signal into an image merging region, which comprises: (A) receiving an image signal, the image signal comprises a plurality of image regions, and each image signal comprises a plurality of image pixels; (B) capturing a first parameter value and a second parameter value of each image region to work out a third parameter value of each image signal; (C) arranging the plurality of image regions in a predetermined order according to the third parameter value of each image region; (D) executing a merging testing process to each image region according to the predetermined order to form a transitorily merged texture color feature region, wherein the transitorily merged texture color feature region comprises the image region and another image region neighboring the image region herein, and capturing a first parameter value and a second parameter value of the transitorily merged texture color feature region to work out a third parameter value of the transitorily merged texture color feature region; and (E) comparing the third parameter value of the transitorily merged texture color feature region against the third parameter value of the image region, and setting the transitorily merged texture color feature region as a merged image region when the third parameter value of the transitorily merged texture color feature region is higher than the third parameter value of the image region.

According to one aspect of the present invention, the subject matter for merging (the plurality of image regions) is obtained from an image signal segmentation method. Such an example includes an image signal segmentation method for segmenting an image signal into a plurality of texture color feature regions. This image signal segmentation method generally comprises the following steps: (A) receiving an image signal, wherein the image signal comprises a plurality of image pixels; (B) applying a Gabor filter bank, executing a Gabor filtering process on each of the image pixels, and executing a value calculation process on an output from the execution of the Gabor filtering process; (C) designating a texture feature vector to the image pixel according to an output from the execution of the value calculation process; (D) executing a segmentation process on each of the image signal according to the texture feature vector designated to the image pixel so as to make the image signal comprise a plurality of texture feature regions, wherein each of the image pixels located in the same texture feature region has texture feature vectors of identical groups; and (E) executing a re-segmentation process on each of a plurality of color feature regions according to a distribution of the texture feature regions in the image signal to make at least one color feature region comprise a plurality of texture color feature regions.

The Gabor filter bank cited in the aforementioned step (B) comprises a plurality of two-dimensional Gabor filtering bank, and there is no limitation on the choice for the number of two-dimensional Gabor filters, and neither is the case with the choice for the distribution of two-dimensional Gabor filters. However, the aforementioned Gabor filter bank is preferred to comprise an internal subband Gabor filter and an external subband Gabor filter, but number of internal subband Gabor filter is not restricted in particular, meaning that the Gabor filter bank may comprise three or more subband Gabor filter bank (for example, internal subband Gabor filter bank, median subband Gabor filter bank, and external subband Gabor filter).

Furthermore, the aforementioned internal subband Gabor filter bank and external subband Gabor filter bank can comprise one or more than one two-dimensional Gabor filters, but a preferred structure is a plurality of two-dimensional Gabor filters, and the number of two-dimensional Gabor filters contained in either internal subband or external subband Gabor filter banks do not necessarily have to be the same. However in order to achieve the best filtering result, a common practice in the industry is to have the same number between internal subband Gabor filter bank and external subband Gabor filter bank.

In addition, in the image signal segmentation method, each of the two-dimensional Gabor filter located in the internal subband Gabor filter bank corresponds to a two-dimensional Gabor filter located in the external subband Gabor filter bank. Such arrangement of two-dimensional Gabor filters set out to constitute a filtering direction of the aforementioned Gabor filter bank. In another aspect of the present invention, the aforementioned two subband Gabor filter bank can make use of four to eight two-dimensional Gabor filters, however, a preferred embodiment of the present invention is configured to use six two-dimensional Gabor filters, meaning that the image signal segmentation method uses twelve two-dimensional Gabor filters. Further, since the direction that each of the two-dimensional Gabor filter located in the internal subband Gabor filter bank corresponds to a two-dimensional Gabor filter located in the external subband Gabor filter bank constitute a filtering direction, the Gabor filter bank used in the image signal segmentation method provides six filtering direction.

Moreover in step (B) of the present invention, the value calculation is preferred to be for calculating a magnitude value of an output from the Gabor filtering process. Then, using the magnitude value in step (C), to designate a texture feature vector corresponding to each image pixel. This means that if in step (B), the number of two-dimensional Gabor filters used to execute the Gabor filtering process is n; the value calculation process will come up with a number of n magnitude values. This n number of magnitude values will be used in designating a texture feature vector to each image pixel. Accordingly, a texture feature vector is equivalent to an n-dimensional vector value (wherein n represents number of dimensions). In other words, the number of dimensionality of the texture feature vector designated to each image pixel is the number of two-dimensional Gabor filters used in a Gabor filtering process in step (B).

After the segmentation process of step (D) of the present invention, a plurality of image pixels of a texture feature vector belonging to an identical group will be categorized into an identical texture feature region. Based on this operation, original image signal (received in step (A)) can be segmented into a plurality of texture feature regions. Wherein, execution of aforementioned segmentation process operates to apply a grouping algorithm, but such algorithm is not limited to a particular type of algorithm. Generally, the grouping algorithm herein can include K-means grouping algorithm, CRLA (constraint run length algorithm) grouping algorithm or SBKM (symmetry distance based K-means algorithm) grouping algorithm etc. For the present invention, a preferred algorithm is K-means grouping algorithm.

According to another aspect of the present invention in step (E) of the image signal segmentation method, it is preferred to include the following step: comparing an area value of the color feature region against a re-segmentation threshold value; and when the area value of one of the color feature regions is higher than the re-segmentizing threshold value, re-segmenting the color feature region into texture color feature region according to the distribution of texture feature regions in the image signal. It should be noted here that the aforementioned re-segmentation threshold value is not limited in particular, but a preferred range of values is between 160 and 200.

Lastly in step (E) of the image signal segmentation method, the plurality of color feature regions contained in the image signal can be obtained from the following method: executing a color feature capture process on the image pixel so as to capture the color feature of each image pixel and designate a color feature vector to the image pixel; applying a grouping algorithm to categorize the image pixel into a plurality of color groups according to the color feature vector designated to each image pixel; and enclosing image pixels that are neighboring each other and located in the same color group within one color feature region. However, the method for capturing the plurality of color feature regions contained in the image signal is not limited by scope to the above-mentioned method, they can be obtained from an algorithm that is commonly known to persons of relevant skills in the industry for capturing the plurality of color feature regions of an image signal.

Other objects, advantages, and novel features of the invention will become more apparent from the following detailed description when taken in conjunction with the accompanying drawings.

LIST OF REFERENCE NUMERALS

31 internal subband Gabor filter bank
32 external subband Gabor filter bank

DETAILED DESCRIPTION OF THE PREFERRED EMBODIMENT

The invention being described herein should be considered as general approach and the following examples are not intended to limit the scope of the invention. It will be understood for those skilled in the art that the same maybe varied in many ways. Although the present invention has been explained in relation to its preferred embodiment, it is to be understood that many other possible modifications and variations can be made without departing from the spirit and scope of the invention as hereinafter claimed.

Figure 1:
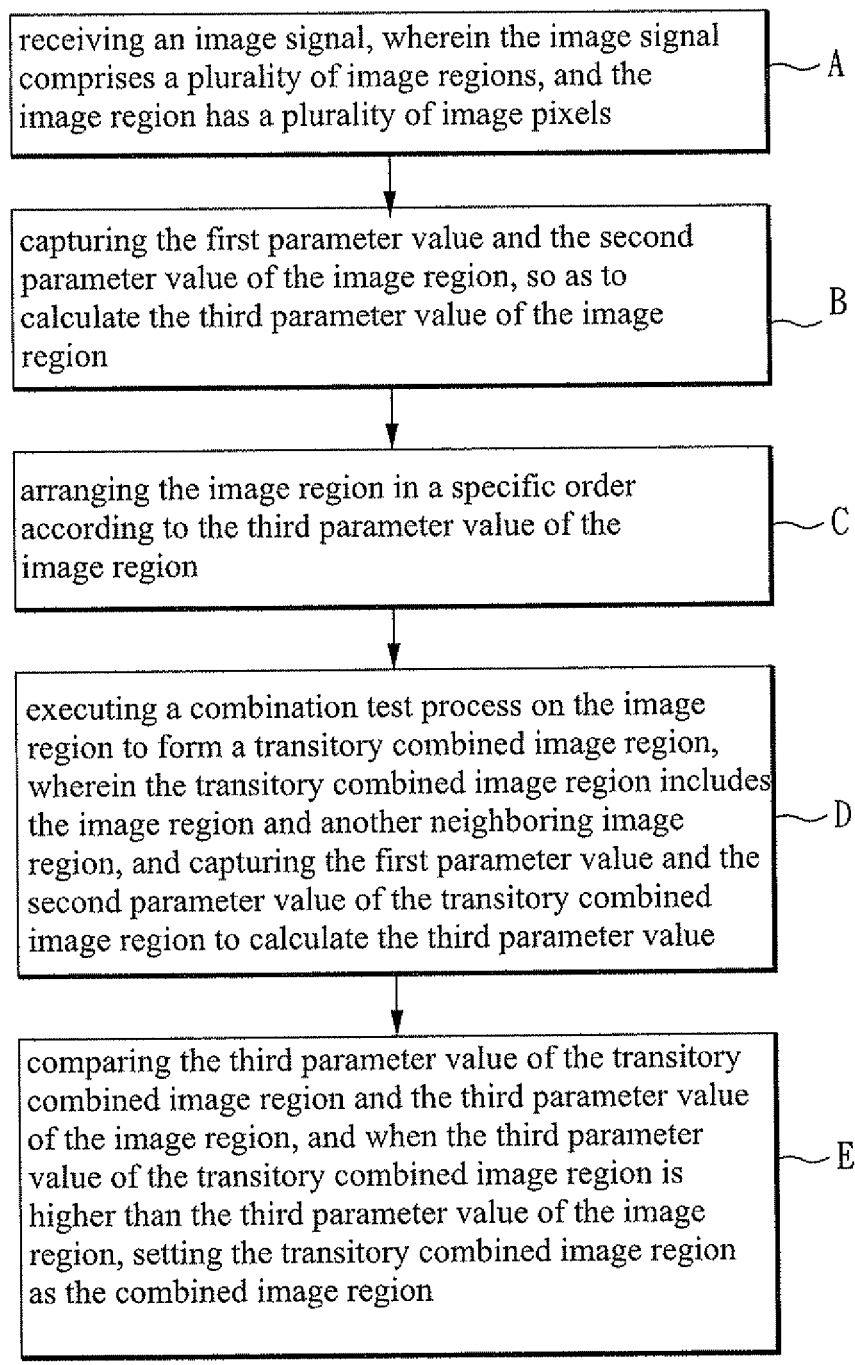
FIG. 1 illustrates a flow chart of steps during operation of an image merging method according to an embodiment of the present invention.

With reference now to FIG. 1, a flow chart of steps during operation of an image region merging method according to an embodiment of the present invention is presented. As illustrated in FIG. 1, the image region merging method according to an embodiment of the present invention comprises the following steps:

(A) receiving an image signal, the image signal comprises a plurality of image regions, and each image signal comprises a plurality of image pixels;

(B) capturing a first parameter value and a second parameter value of each image region to work out a third parameter value of each image signal;

(C) arranging the plurality of image regions in a predetermined order according to the third parameter value of each image region;

(D) executing a merging testing process to each image region according to the predetermined order to form a transitorily merged texture color feature region, wherein the transitorily merged texture color feature region comprises the image region and another image region neighboring the image region herein, and capturing a first parameter value and a second parameter value of the transitorily merged texture color feature region to work out a third parameter value of the transitorily merged texture color feature region; and (E) comparing the third parameter value of the transitorily merged texture color feature region against the third parameter value of the image region, and setting the transitorily merged texture color feature region as a merged image region when the third parameter value of the transitorily merged texture color feature region is higher than the third parameter value of the image region.

Firstly, for step (A) of the image region merging method according an embodiment of the present invention, the method begins with receiving an image signal, and the image signal comprises a plurality of image regions, and these image regions comprise a plurality of image pixels. Furthermore for the present embodiment, there is no set limitation on the choice for the format of the image signal, meaning that the image signal represented by any format can be applied in an image region merging method according to an embodiment of the present invention. In the present embodiment, these image regions comprise a plurality of texture color feature regions, and these texture feature regions are segmented from an image signal by an image signal segmentation method.

Figure 2:
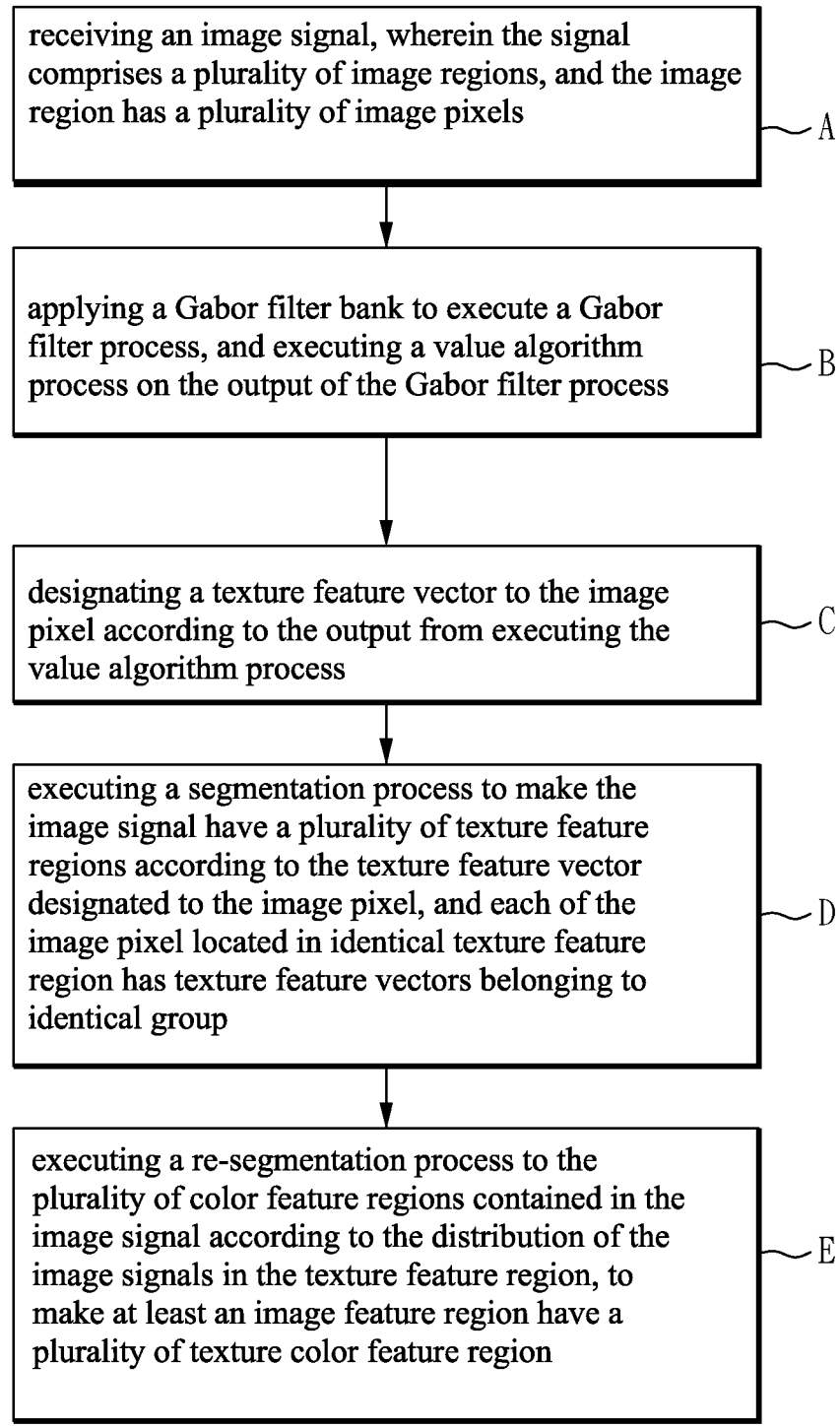
FIG. 2 illustrates a flow chart of steps during operation of the image merging method for segmenting an image signal into a plurality of texture color feature regions.

Referring now to FIG. 2, a flow chart of steps during operation of the image merging method for segmenting an image signal into a plurality of texture color feature regions is presented. The image signal segmentation method comprises the following steps:

(A) receiving an image signal, the image signal comprises a plurality of image pixels;

(B) applying a Gabor filter bank, executing a Gabor filtering process on the image pixels, and executing a value calculation process based on an output from executing the Gabor filtering process;

(C) designating a texture feature vector on each of the image pixels based on an output of exeucing the value calculation process;

(D) executing a segmentation process on each of the image signals based on texture feature vector designated to the image pixel so as to make the image signal comprise a plurality of texture feature regions, wherein each of the image pixels located in the same texture feature region has texture feature vectors of identical groups; and (E) executing a re-segmentation process on each of a plurality of color feature regions according to a distribution of the texture feature regions in the image signal to make at least one color feature region comprise a plurality of texture color feature regions.

Step (A) begins with receiving an image signal, and the image signal comprises a plurality of image pixels. And in the present embodiment, there is no limitation on the scope of choice for the format of the image signal. Meaning that an image signal represented by any format may be applied to an image signal segmentation method according to an embodiment of the present invention.

Next in step (B), this step involves applying a Gabor filter bank, executing a Gabor filtering process on each of the image pixels contained in an image signal, and then executing a value calculation process thereon. In the present embodiment, the Gabor filter bank comprises an internal subband Gabor filter bank and an external subband Gabor filter bank, and the internal subband Gabor filter bank and the external subband Gabor filter bank each comprises six two-dimensional Gabor filters. Since the Gabor filters (regardless of one-dimensional Gabor filter or two-dimensional Gabor filter) have been well known in the field in various situations, the detailed operation mode and way of disposing those two-dimensional Gabor filters will not be further described here.

In another embodiment of the present invention, the aforementioned value calculation process entails calculating the magnitude of the output from the Gabor filtering process.

The next step (C) involves designating a texture feature vector to each image pixel contained in the image signal based on the output of the aforementioned value calculation process. Wherein, the number of dimensions of these texture feature vectors is equal to the number of two-dimensional Gabor filters used in the Gabor filtering process in step (B).

The step (D) involves executing a segmentation process on the image signal based on the texture feature vector designated to each of the image pixels so as to make the image signal have a plurality of texture feature regions. In the present embodiment, the segmentation process uses K-means grouping algorithm. As per the detailed steps for K-means grouping algorithm, since K-means is well known in various fields and understood by persons in the industry, further description will not be provided here.

In yet another embodiment of the invention, the plurality of image pixels located in the same texture feature region will turn out to have the texture feature vectors belonging to the same group after a segmentation process.

The last step (E) relates to executing a re-segmentation process on each of a plurality of color feature regions according to a distribution of the texture feature regions in the image signal to make at least one color feature region comprise a plurality of texture color feature regions. And the re-segmentation process comprises the following steps: (E1) comparing an area value of the color feature region against a re-segmentation threshold value; and (E2) re-segmenting the color feature region into texture color feature region based on the distribution of texture feature region in the image signal, when the area value of the color feature region is higher than the re-segmentation threshold value.

Figures 3, 4:
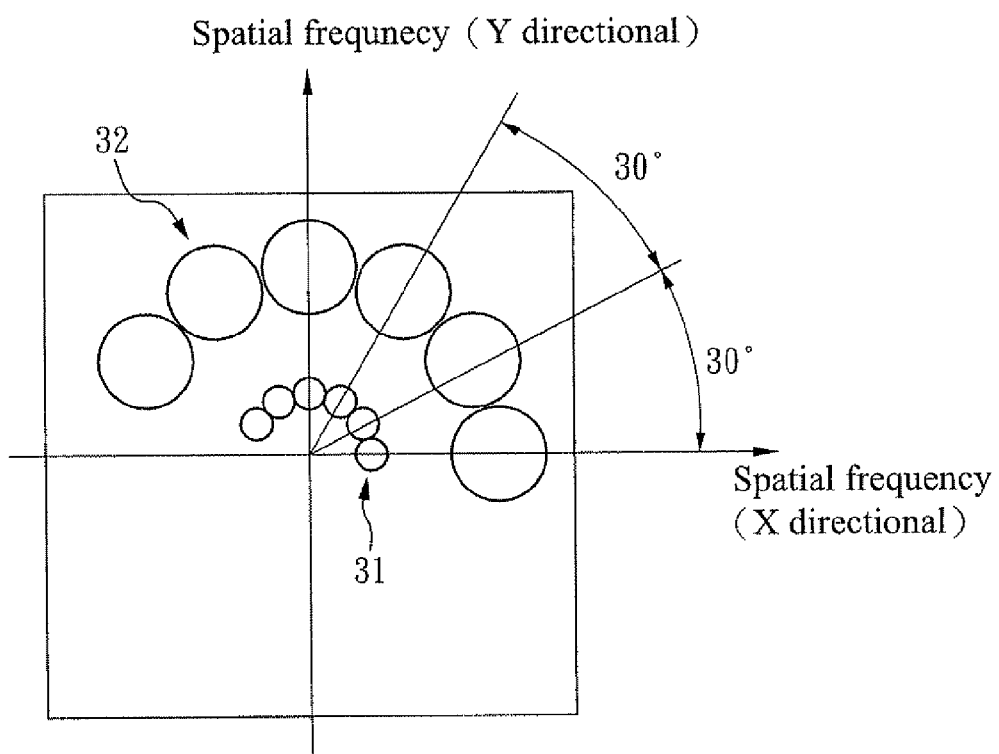
FIG. 3 shows a distribution of twelve two-dimensional Gabor filters on a space plane, as shown in the image signal segmentation method in FIG. 2.
FIG. 4 shows a flow chart of steps during operation of the re-segmentation method, as shown in the image signal segmentation method in FIG. 2.

FIG. 3 shows a distribution of twelve two-dimensional Gabor filters on a space plane, as shown in the image signal segmentation method in FIG. 2. As shown in FIG. 3, for the aforementioned image signal segmentation method, the Gabor filter comprises an internal subband Gabor filter bank 31 and an external subband Gabor filter bank 32, and the internal subband Gabor filter bank 31 and the external subband Gabor filter bank 32 each comprises twelve two-dimensional Gabor filter, and the distribution of these twelve two-dimensional Gabor filters on a space plane is further described in FIG. 3.

Furthermore, these twelve two-dimensional Gabor filters can each be described by the following formula:

$$g(x, y; \sigma_x, \sigma_y, \omega, \theta) = \frac{1}{2\pi\sigma_x\sigma_y} e^{-\frac{1}{2}\left(\left(\frac{x'}{\sigma_x}\right)^2 + \left(\frac{y'}{\sigma_y}\right)^2\right)} e^{j\omega x'};$$ (Formula 1)

Wherein $\sigma_x$, $\sigma_y$ is each a standard deviation of a Gaussian core, $\omega$ is a Fourier fundamental frequency, $\theta$ is the direction of the two-dimensional Gabor filter. Furthermore, x', y', x, y all satisfy the following formulas:

$$x' = x \cos\theta + y \sin\theta;$$ (Formula 2)

$$y' = -x \sin\theta + y \cos\theta;$$ (Formula 3)

In an embodiment of the present invention, the standard deviations $\sigma_x$, $\sigma_y$ of the six two-dimensional Gabor filters making up the internal subband Gabor filter bank 31 are preferred to be set between 1.75 and 3.25, and the standard deviations $\sigma_x$, $\sigma_y$ of the six two-dimensional Gabor filters making up the external subband Gabor filter bank 32 are preferred to be set between 1.75 and 3.75. In addition, the Fourier fundamental frequency $\omega$ is preferred to be set between $0.2\pi$ and $0.67\pi$.

Turning now to FIG. 3, wherein the lateral axis of FIG. 3 represents the x-axis of the spatial frequency, and longitudinal axis represents the y-axis of the spatial frequency, and each circle of FIG. 3 represents the distribution on a spatial frequency plane (field) of a particular parameter ($\sigma_x$, $\sigma_y$, $\omega$ and $\theta$) for a two-dimensional Gabor filter undergoing a 2-D Fourier transformation. As will be seen in FIG. 3, the six two-dimensional Gabor filters located in internal circle comprise internal subband Gabor filter bank 31, and those located in external circle comprise external subband Gabor filter bank 32.

Furthermore, since the direction that a two-dimensional Gabor filter of an internal subband Gabor filter bank 31 extends to a corresponding two-dimensional Gabor filter of an external subband Gabor filter bank 32 makes for a filtering direction, it will be understood that the Gabor filter bank in FIG. 3 means to cover six filtering direction. Wherein, these six filtering direction all begin with 0° as the starting angle, and uses 30° as the intervening space between two filtering direction, therefore, the six filtering direction of the Gabor filter bank shown in FIG. 3 includes 0°, 30°, 60°, 90°, 120°, and 150°.

In another embodiment of the present invention, the $\sigma_x$ and $\sigma_y$ of the six two-dimensional Gabor filters of the internal subband Gabor filter bank 31 are configured to be 2.75, and their Fourier fundamental frequency are predetermined to be $0.27\pi$. In yet another embodiment, the $\sigma_x$ and $\sigma_y$ of the six two-dimensional Gabor filters of the external subband Gabor filter bank 32 are predetermined to be $0.67\pi$.

FIG. 4 shows another embodiment of the present invention, which shows a flow chart of steps during operation of the re-segmentation method, as shown in the image signal segmentation method in FIG. 2. As illustrated in FIG. 4, the aforementioned re-segmentation process comprises the following steps:

comparing an area value of the color feature region against a re-segmentation threshold value; and re-segmenting the color feature region into a texture color feature region based on the distribution of the image signals in the texture feature region, when an area value of the color feature region is higher than the re-segmentation threshold value.

In the present embodiment, the aforementioned re-segmentation threshold value is set at 180, but it may be turned to other suitable value depending on the surrounding condition, including any value between 150 and 210.

Figure 5:
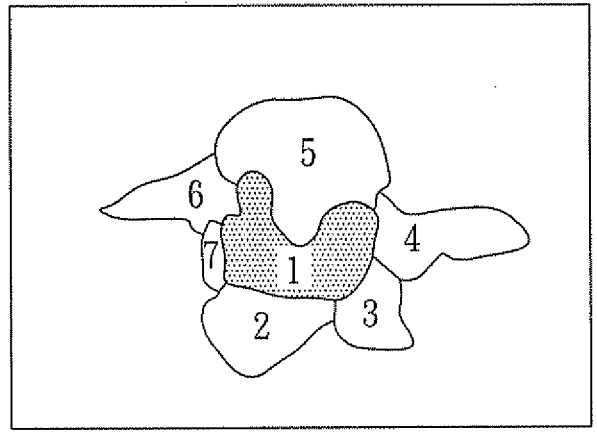
FIG. 5 shows a distribution of a plurality of image regions in an image signal.

From here, the distribution of a plurality of image regions in an image signal may be obtained as shown in FIG. 5. Wherein, a total of seven image regions (texture color feature regions) is a result of the segmentation.

Within step (B) of the image region merging method based on an embodiment of the present invention, the next step is to capture a first parameter value and a second parameter value contained in each image region so as to work out a third parameter value contained in the image region. In the present embodiment, the first parameter value is the area value of each image region, the second parameter value is the perimeter length value of each image region, and the third parameter value is the compactness value of each image region.

Referring now to FIG. 5, which shows a distribution of a plurality of image regions in an image signal. And in the present embodiment, these seven image regions are seven texture color feature regions, and each is tagged with a label (label 1 to 7). Furthermore, a compactness value, which is the third parameter value of an image region, is obtained according to the following formula:

$$C = \frac{A}{P^2};$$ (Formula 4)

wherein C is the compactness value, A is the area value; P is the perimeter length value.

Accordingly, a compactness value of each image region (texture color feature region) can be calculated.

Next, in step (C) of the image region merging method according to an embodiment of the present invention, arrange the plurality of image regions in a predetermined order according to the compactness value of each image region. In the present embodiment, the arrangement order is based on an increasing fashion such that image regions having larger area value precedes image regions having smaller area value, and the aforementioned seven image regions (texture color feature region) are arranged in such order fashion.

Also, in step (D) of the image region merging method according to an embodiment of the present invention, execute a merging test procedure based on the aforementioned order (from image regions having larger area value precedes image regions having smaller area value) so as to form a transitorily merged image region. Wherein, the transitorily merged image region includes one of the image regions and a neighboring image region, and capture a first parameter value and a second parameter value of the transitorily merged image region, so as to work out a third parameter value.

In the present embodiment, the operation begins with executing the aforementioned merging test process from the image region labeled as 1 (texture color feature region). As shown in FIG. 5, the operation begins merging first from the several image regions (texture color feature regions) neighboring the image region labeled in 1. For example, image regions labeled in 1 (texture color feature region) and image regions labeled in 5 (texture color feature region) are merged into a transitorily merged image region. Next, image regions labeled in 1 (texture color feature region) and image regions labeled in 5 (texture color feature region) are merged into another transitorily merged image region, and so on.

However, in some application conditions, a step of executing a threshold value verification process will be performed before executing the aforementioned "merging test process". This involves comparing in advance the area value and compactness value of each image region against the area threshold value and compactness threshold value. Also, such aforementioned merging test process will only be initiated when the area value of an image region is lower than the aforementioned area threshold value, and the compactness value of the image region is lower than the aforementioned compactness threshold value. In the present embodiment, the aforementioned area threshold value is between 120 and 240, and is preferred to be at 180, and the compactness threshold value is between 0.001 and 0.008, and is preferred to be at 0.003, depending on the requirement and condition in the environment.

Figure 6:
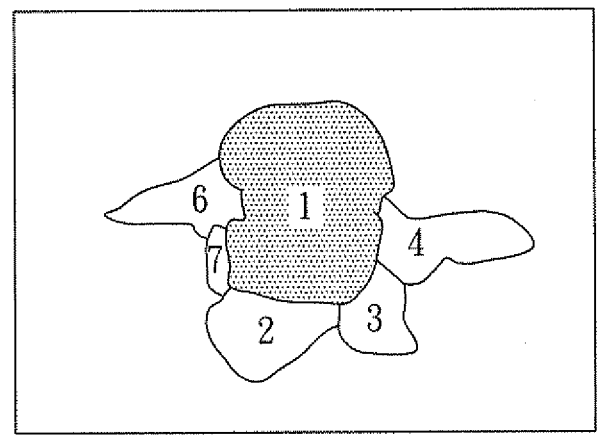
FIG. 6 shows the merging of an image region labeled as 1 and an image region labeled as 5 into a transitorily merged image region.

Subsequently, as shown in FIG. 6, image region labeled in 1 (texture color feature region) and image region labeled in 5 (texture color feature region) are merged into a transitorily merged image region, and the transitorily merged image region resulting from these two image regions (texture color feature regions) can be captured. Accordingly, the compactness value of the transitorily merged image region can be calculated.

Lastly, for step (E) of the image region merging method according to an embodiment of the present invention, compare the compactness value of the transitorily merged image region against the compactness value of the image region labeled in 1 (texture color feature region). When the compactness value of the transitorily merged image region is higher than the compactness value of the image region labeled in 1 (texture color feature region), set the transitorily merged image region as the merged image region. Otherwise, if the compactness value of the transitorily merged image region is not higher than the compactness value of the image region labeled in 1 (texture color feature region), repeat the aforementioned step (D). For example, merge image region labeled in 1 (texture color feature region) and image region labeled in 4 (texture color feature region) into another transitorily merged image region, and capture area value and perimeter value of another transitorily merged image region, so as to further work out a compactness value of another transitorily merged image region.

And when all the image regions (texture color feature regions) neighboring the image region labeled in 1 (texture color feature region) have undergone the aforementioned merging test process, follow the aforementioned ordering (preceding image regions having larger area value before image regions having smaller area value), and turn to base image regions having large area as the fundamental image region for executing merging test process.

Finally, when all the image regions (texture color feature region) have undergone the aforementioned merging test process (to be treated as the fundamental image region for the merging test process), the image region merging method according to an embodiment of the present invention is completed, and each image region satisfying the region merging condition (such as the compactness value being lower than the compactness threshold value) is merged with the plurality of merged image regions according to their relative position toward each other in the image signal.

Wherefore, a method for merging the regions in the image/video of the present invention has been demonstrated to be operable based on the compactness value of each image region contained in a an image signal, which works to merge two or more than two image regions into a merged image region having larger area, so as to increase the efficiency of high image identification.

The embodiments described herein are exemplary only and are not limiting.

What is claimed is:

1. An image region merging method for merging a plurality of image regions into a merged image region, comprising:
    (A) receiving an image signal, wherein the image signal comprises a plurality of image regions, and each image region comprises a plurality of image pixels;
    (B) capturing a first parameter value and a second parameter value of each image region to work out a third parameter value of each image region;
    (C) arranging the plurality of image regions in a predetermined order according to the third parameter value of each image region;
    (D) executing a merging testing process to each image region according to the predetermined order to form a transitorily merged texture color feature region, wherein the transitorily merged texture color feature region comprises the image region and another image region neighboring the image region herein, and capturing a first parameter value and a second parameter value of the transitorily merged texture color feature region to work out a third parameter value of the transitorily merged texture color feature region; and
    (E) comparing the third parameter value of the transitorily merged texture color feature region against the third parameter value of the image region, and setting the transitorily merged texture color feature region as a merged image region when the third parameter value of the transitorily merged texture color feature region is higher than the third parameter value of the image region;
    wherein the first parameter value of each image region is an area value of the image region, the second parameter value of each image region is a perimeter value of the image region, and the third parameter value of each image region is a compactness value of the image region;
    wherein the compactness value of the image region is calculated by the following formula:

$$C = \frac{A}{P^2}$$

wherein C is a compactness value, A is an area value, and P is a perimeter value; and
   wherein in step (D), comparing the area value of an image region against an area threshold value, and comparing the compactness value of the image region against a compactness threshold value, and when the area value of the image region is lower than the area threshold value, and when the compactness value of an image region is lower than the compactness threshold value, executing the merging test process.

2. The method as claimed in claim 1, wherein the image region comprises a plurality of texture color feature regions, and the texture color feature regions are segmented from an image signal by an image signal segmentation method.

3. The method as claimed in claim 2, wherein the image signal segmentation method comprises:
(A) receiving an image signal, wherein the image signal comprises a plurality of image pixels;
(B) applying a Gabor filter bank, executing a Gabor filtering process on the image pixels, and executing a value calculation process based on an output from executing the Gabor filtering process;
(C) designating a texture feature vector on each of the image pixels based on an output of executing the value calculation process;
(D) executing a segmentation process on the image signal based on texture feature vector designated to each image pixel so as to make the image signal comprise a plurality of texture feature regions, wherein each of the image pixels located in a same texture feature region has texture feature vectors of identical groups; and
(E) executing a re-segmentation process on each of a plurality of color feature regions according to a distribution of the texture feature regions in the image signal to make at least one color feature region comprise a plurality of texture color feature regions; wherein the image pixels located in a same texture color feature region all have texture feature vectors belonging to a same group and color feature vectors belonging to a same group.

4. The method as claimed in claim 3, wherein the Gabor filter bank comprises an internal subband Gabor filter bank and an external subband Gabor filter bank, and the internal subband Gabor filter bank and the external subband Gabor filter bank each comprises a plurality of two-dimensional Gabor filters.

5. The method as claimed in claim 4, wherein each two-dimensional Gabor filter is described by the following formula $$g(x, y; \sigma_x, \sigma_y, \omega, \theta) = \frac{1}{2\pi\sigma_x\sigma_y} e^{-\frac{1}{2}\left(\left(\frac{x'}{\sigma_x}\right)^2 + \left(\frac{y'}{\sigma_y}\right)^2\right)} e^{j\omega x'}$$

wherein $\sigma_x$, $\sigma_y$ is each a standard deviation of a Gaussian core, $\omega$ is a Fourier fundamental frequency, $\theta$ is the direction of the two-dimensional Gabor filter, and wherein x', y', x, y all satisfy the following formulas:

$$x'=x \cos \theta + y \sin \theta$$

$$y'=-x \sin \theta + y \cos \theta.$$

6. The method as claimed in claim 3, wherein the re-segmentation process of the image signal segmentation method comprises:
comparing an area value of the color feature region against a re-segmentation threshold value;
re-segmenting the color feature region into texture color feature region based on the distribution of texture feature region in the image signal, when the area value of the color feature region is higher than the re-segmentation threshold value.

7. The method as claimed in claim 3, wherein the color feature regions used in the image signal segmentation method are obtained from the following steps:
executing a color feature capture process on an image pixel so as to capture color feature of the image pixel and designating a color feature vector to the image pixel;
applying a grouping algorithm based on a color feature vector designated to each image pixel so as to categorize the image pixels into a plurality of color groups; and
enclosing the image pixels that are neighboring to each other and located in a same color group into a same color feature region.

8. The method as claimed in claim 1, wherein image regions are arranged in an order where image regions having larger area value precedes image regions having smaller area value.

9. The method as claimed in claim 1, wherein the area threshold value is between 120 and 240, and the compactness threshold value is between 0.001 and 0.008.

* * * * *